United States Patent [19]

Watkiss

[11] Patent Number: 5,118,344
[45] Date of Patent: Jun. 2, 1992

[54] RECOVERY OF SILVER

[75] Inventor: Philip J. Watkiss, W. Yorkshire, United Kingdom

[73] Assignee: E. I. Du Pont de Nemours and Company (Inc.), Wilmington, Del.

[21] Appl. No.: 424,159

[22] Filed: Oct. 19, 1989

[30] Foreign Application Priority Data

Oct. 24, 1988 [GB] United Kingdom ............... 8824842

[51] Int. Cl.$^5$ .............................................. C22B 3/44
[52] U.S. Cl. ....................................... 75/713; 134/26; 134/34
[58] Field of Search .................... 75/713, 715, 741; 134/26, 34, 42

[56] References Cited

U.S. PATENT DOCUMENTS

| 3,617,253 | 11/1971 | Amiet | 75/741 |
| 3,961,982 | 6/1976 | DeLorenzo | 134/3 |
| 4,324,705 | 4/1982 | Seto et al. | 134/10 |
| 4,799,954 | 1/1989 | Hochberg | 75/713 |

FOREIGN PATENT DOCUMENTS 331006  6/1930  United Kingdom ................ 75/713

Primary Examiner—Melvyn J. Andrews
Attorney, Agent, or Firm—Harness, Dickey & Pierce

[57] ABSTRACT

In a method of recovering silver from an aqueous suspension, the suspension is admixed with a solution capable of converting silver halide to metallic silver to cause flocculation of the silver, the flocculated silver is separated from the aqueous phase, and the silver is recovered.

6 Claims, No Drawings

RECOVERY OF SILVER

This invention relates to the recovery of silver and is concerned with recovering silver from high sensitivity printing plates.

The well-known comparatively high sensitivity to light of silver halides over conventional photopolymeric materials and their ability to respond to light from ultra-violet to infra-red make them ideally suited for use in printing plate applications where direct exposure, rather than exposure through a contact film intermediate, is called for.

Silver halides in this context can be used in a variety of ways. For example, oxidised developing agent generated on development of exposed silver halide can cross-link the gelatin or other matrix material so providing a tough ink-receptive image. This technique is often referred to as tanning development. Alternatively, a silver halide emulsion layer can be overcoated onto a conventional photopolymerisable layer. Due to the difference in sensitivity between the layers a low light exposure can be used to imagewise expose the top silver halide layer which, on development, forms a mask for a second, blanket, high light exposure to convert the polymeric layer into a soluble or insoluble form depending on the nature of the photopolymer.

A third general use of silver halide in printing plate applications is the well known technique of diffusion transfer reversal (DTR). In this method a developer is used which chemically develops exposed areas of the coating whilst at the same time dissolving the unexposed areas. The dissolved areas of silver halide, generally in the form of silver thiosulphate or thiocyanate complexes, diffuse to a nucleation layer where metallic silver is formed by reduction of the complexes. This silver can be made oleophilic, for example by use of a mercapto compound, such as 1-phenyl-5-mercaptotetrazole, and used as the printing image of a lithographic printing plate.

In the latter two examples in particular, silver in a coated layer is generated as a by-product which plays no part in the final printing process. The problem then arises of recovering this "non-useful" silver.

In DTR systems which comprise two separate sheets, one containing the light sensitive silver halide coating and the other coated with a nucleating agent, the chemically developed silver remaining in the light sensitive layer is the by-product and can be recovered from this layer quite easily by, for example, incinerating the layer.

In the case of masked systems or the case where an integral DTR system is employed in which the chemically developed areas are physically removed, then the non-useful silver must be removed during processing of the printing plate.

One object of the present invention is to provide a method for the economic recovery of silver from an aqueous suspension in a convenient form which minimises pollution.

Another object of the present invention is to provide a method for the removal of silver-containing coating from a substrate and the subsequent economic recovery of the silver in a convenient form which minimises pollution.

A further object of the present invention is to provide a method of processing a substrate having a radiation sensitive silver-containing coating which method is capable of giving economic recovery of silver removed from the substrate.

According to one aspect of the present invention there is provided a method of recovering silver from an aqueous suspension comprising admixing the suspension with a solution capable of converting silver halide to metallic silver to cause flocculation of the silver, separating the flocculated silver from the aqueous-phase, and recovering the silver.

According to another aspect of the present invention there is provided a method of recovering non-useful silver from an article obtained by image-wise exposing and developing a substrate coated with a layer containing silver-halide and binder, which method comprises physically removing the non-useful silver and binder from the substrate so as to form a suspension of silver in an aqueous solution of the binder; flocculating the suspension by admixture with a developer which has been used to develop an image-wise exposed substrate coated with a layer containing silver halide; separating the flocculated silver and binder; and recovering the silver.

The substrate may be, for example, paper, polyester subbed paper, polyester, grained and anodised aluminium or composites of these materials.

In a particularly preferred form of the invention the coated substrate is a printing plate precursor and, after exposure, this is developed by applying a liquid developer. The developed precursor is then transferred to a separate tank in which the non-useful silver is physically removed by a scrubbing action, or by the action of water jets, in an aqueous solution. The substrate can then pass through a rinsing section to remove any remaining non-useful silver and also through any subsequent processing stages necessary for the production of the printing plate. Other process stages can be included between the development and the wash-off stages depending on the type of printing plate concerned. For example, in a masked system, fixation, rinsing, drying and re-exposure stages may be introduced between development and washing.

In accordance with a particularly preferred feature of the invention, a plurality of precursors is processed and the silver removed in the wash section is allowed to accumulate as a suspension of silver in binder in this section to make subsequent recovery of silver economic. Residual silver removed in a subsequent rinse section may also be allowed to accumulate as a suspension of silver in binder, which suspension may then be combined with the suspension from the wash section.

Silver, together with substantially unhardened binder, e.g. gelatin is removed in this stage in addition to other polymeric materials e.g. synthetic polypeptides in overcoats or interlayers which may have been present on the substrate. An aqueous solution is used as the washing medium. This can be simply water or it can be a mixture of surfactants to facilitate the washing action. In addition corrosion inhibitors can be added to protect the silver image areas of a DTR printing plate, or to protect the substrate if a metallic material is used. Anti-foaming agents may also be added at intervals to prevent the natural foaming tendency often associated with gelatin solutions. An aqueous solution, or simply water, can be used as the subsequent rinsing medium.

The used processing solutions from the subsequent process stages which may be carried out after the washing or rinsing stages may contain further non-useful silver which may, for example, have been carried over from the wash-off or rinsing stages. In accordance with another preferred feature of the invention, the used processing solutions may be combined with the suspension from the wash-off section and/or the rinse section, provided that said solutions do not have a detrimental effect on the flocculation of the silver.

The silver/binder suspension is then flocculated and it has surprisingly been found that fresh or spent developers commonly used in photographic applications, when mixed with the accumulated silver-bearing suspension in the wash water provide an excellent flocculation medium with several advantages over conventional flocculating materials.

Similarly, such developers also provide an excellent flocculation medium when mixed with the accumulated silver-bearing suspension in the combined wash water, rinse water and, if required, used processing solutions.

Photographic developers have only limited lifetimes due to oxidation effects and build-up of halides from the silver halide emulsion. By mixing together spent developer and the above silver suspension use is made of these otherwise waste products. Furthermore, the amounts of spent developer and wash water, rinse water and used processing solution wastes can be simply arranged so that all are disposed of at the same time, thus providing for a simple and effective control of flocculant addition. So, for example, if the coating weight of the silver halide in the coating were varied, provision would be needed to vary the amount of flocculating agent. By using the spent developer from the developing stage this is allowed for with the developer becoming exhausted in line with the coating weight variation.

A further advantage is that a separate flocculating agent is not needed, making practical operation much simpler and cheaper.

A still further advantage is that silver particles in the developer are removed by this method. Also, dissolved silver complexes in the wash water, rinse water and used processing solutions particularly in a DTR system will be reduced to metallic silver on mixing with the developer, thus providing a low dissolved silver content in the supernatant liquors, typically less than 2 mg silver/liter.

Accordingly, a further aspect of the present invention provides a method of processing a printing plate precursor comprising a substrate coated with a radiation sensitive composition, which method comprises
(i) image-wise exposing the coating;
(ii) applying developer to cause silver halide in the exposed area to be chemically developed so as to form metallic silver;
(iii) washing the substrate with an aqueous solution to form metallic silver and associated binder in suspension in the washing solution;
(iv) combining the used developer and the washing solution to cause flocculation of the silver; and
(v) separating the silver from the aqueous phase.

In accordance with another preferred feature of the invention, after the washing and prior to the separation of the silver from the aqueous phase, the substrate is rinsed to form a suspension of any remaining non-useful silver in the rinse solution, and the rinse solution is subsequently combined with the washing solution and the used developer.

In accordance with a further preferred feature of the invention, after the washing and prior to the separation of the silver from the aqueous phase, the substrate undergoes further processing stages and used processing solutions from said processing stages are combined with the washing solution and the used developer, provided that said processing solutions do not have a detrimental effect on the flocculation of the silver.

Another aspect of the present invention provides a method of processing a plurality of printing plate precursors each comprising a substrate coated with a layer containing silver halide and binder which method comprises
i) image-wise exposing the layer of one of said precursors;
ii) forming, on the substrate of the precursor, a developed image containing silver, by applying a liquid developer to the image-wise exposed layer of the precursor,
iii) separating the spent liquid developer from the substrate of the precursor;
iv) removing the non-useful silver and binder from the substrate to form a suspension of silver in an aqueous solution of the binder;
repeating steps (i), (ii), (iii) and (iv) for each of the other precursors;
vi) combining the spent liquid developer obtained in each case,
(vii) combining the suspension of silver in aqueous solution of binder obtained in each case;
(viii) admixing the combined suspensions with the combined spent liquid developer to flocculate the combined suspensions;
(ix) separating the flocculated silver and the binder, and
(x) recovering the silver.

In accordance with a yet further preferred feature of the present invention after the removal of the non-useful silver and binder from the substrate each substrate undergoes further processing stages, the used processing solutions from each of said processing stages are combined and the combined used processing solutions are admixed with the combined spent liquid developer and the combined suspensions of silver in aqueous solution of binder, provided that said used processing solutions do not have a detrimental effect on the flocculation of the silver.

It has been found that the flocculating ability of the developer is improved at high salt concentrations (particularly high sulphite salt concentrations) and/or if one or more polymeric materials, typically added to the developer as thickening agents, or as part of the photosensitive assembly as an overcoat or interlayer, are present. Examples of these materials include sodium carboxy methyl cellulose, hydroxy ethyl cellulose, polyacrylamide, polyacrylate, copolymers of acrylic materials, polyethylene imine, polyvinyl pyrrolidone, polyvinyl alcohol and gum arabic. Particularly preferred thickeners or vehicles are those which show incompatibility with gelatin.

If desired, additional flocculating agents may be added to the combined used developer and suspension of silver to aid the rate or degree of flocculation.

Separation efficiencies, measured as the ratio of the volume of supernatant to sediment, of better than 99.5% can be achieved by this method. Consequently, decantation or siphonage of the supernatant liquors after sedimentation leaving only the residual silver-bearing solids becomes a very economical and efficient method of concentrating the silver wastes. Alternatively, the flocculated material can be filtered very effectively either by gravity or vacuum before sedimentation has occurred. This is due to the excellent filter-cake forming ability of the flocculated material.

The following Examples illustrate the invention.

EXAMPLE 1

A silver chlorobromide emulsion in gelatin binder having a silver to gelatin weight ratio of 1:1 was coated onto a grained and anodised aluminium substrate which had been dipped in a 1% solution of a Carey Lea silver sol. The coating weight of the emulsion was 1.3 gm $m^{-2}$ expressed as silver. The system thus constituted an integral DTR assembly. After image-wise exposure the plate was developed for 30 seconds at 20° C. in the following developer solution (D1).

110 gm/l: sodium sulphite
20 gm/l: hydroquinone
6 gm/l: 1-phenyl-3-pyrazolidone
20 gm/l: sodium hydroxide
10 gm/l: sodium thiosulphate
30 mls/l: 2-methyl amino ethanol
12 gm/l: sodium carboxy methyl cellulose (CMC)

This gave chemically reduced silver in the exposed areas and physically reduced silver attached to the anodised aluminium in the non-exposed areas.

After processing, the plate was transferred to a wash section comprising scrub rollers and water jets. This removed the loose material from the plate which comprised silver metal, gelatin, developer and silver complexes. The wash waters were retained after processing several pieces of plate. The final solids content in silver and gelatin was approximately 10 gm/l and approximately 2.6 gm/l of silver metal, though the total solids material was close to 50 gm/l due to dragover of developer into the wash tank. The silver content of the developer was approximately 3 mg/l as silver in solution either as a fine suspension or as silver complex ions and 1.6 gm/l as solid sedimental silver. This was due to silver complexes diffusing into the developer during processing and their subsequent reduction by the action of the hydroquinone.

The wash water was used as the basis for a number of tests to demonstrate the scope of the invention.

EXAMPLE 2

1 part of used developer from Example 1 and 1 part of the wash water were mixed together and resulted in a separation of the solids to form a clear supernatant after 6-12 hours standing at room temperature. The free silver content of the supernatant liquid after 24 hours standing was measured by atomic absorption spectroscopy at 2 mg silver/liter.

Neutralising the developer with citric acid or sulphuric acid to pH 7.0 gave a similar separation efficiency.

The volume of solids precipitated to supernatant was 0.5 to 99.5 or better.

Separation could be achieved simply by decantation of the supernatant or by drainage.

Alternatively, the mixture could be filtered through a coarse fabric filter after standing for 30 minutes. The flocculated suspension of the wash water rapidly formed a cake on the fabric giving a clear filtrate solution.

The filtrate or supernatant could be discharged slowly to drain, or could be further purified by passing it over charcoal and/or resin beds, or rendered environmentally safer by other well known means.

EXAMPLE 3

The wash water was adjusted from pH 11 to pH 7.0 with citric acid. To this was mixed 0.4 gm trypsin/100 mls wash water (trypsin activity 90 E/mg). After standing for 48 hours a clear supernatant was obtained containing 13 mg silver/liter.

A bacterial alkaline proteinase, Proteinase D from ABM Chemicals, was added at 1% and 5% to further samples of the wash water with no pH adjustment. After 48 hours standing at room temperature the 5% solution had given good separation and a clear supernatant, but the 1% solution still contained suspended material.

This example illustrates that although an enzymatic treatment can give good separation, the conditions need to be carefully controlled to obtain good sedimentation. In addition, the free silver content of the wash water is higher than in Example 2. Furthermore, there is still the problem of recovery of the silver contained in the developer.

EXAMPLE 4

Aluminium sulphate as a 10% solution of $Al_2(SO_4)_3$ was added at 20 mls per 100 mls of the wash water. Coagulation occurred but there was no separation on standing. The coagulated solids could be removed by filtration, though rapid fouling of the filter media occurred.

EXAMPLE 5

Using the spent developer of Example 1 and the wash water as described above, the ratio, by volume, of developer to wash water was varied. The sedimented solids were collected after appropriate intervals and the percentage solids removed in this way was calculated.

| Developer: | % soldis removed after | | | | | |
|---|---|---|---|---|---|---|
| Wash Water | 1 day | 2 days | 4 days | 8 days | 11 days | 14 days |
| 1:3 | 18 | 48 | 62 | 80 | 88 | 100 |
| 1:2 | 42 | 77 | 88 | 100 | | |
| 1:1 | 100 | | | | | |
| 2:1 | 100 | | | | | |

As a control, wash water by itself showed only a 13% removal of solids by sedimentation after 8 weeks standing at room temperature.

EXAMPLE 6

Wash water, collected as in Example 1, of varying solids contents (measured as the total of silver plus binder) was assessed for sedimentation rate by mixing equal proportions of the used developer of Example 1 with the wash water.

| Wash Water Solids (g/l) | % Solids removed after 1 day |
|---|---|
| 20 | 100 |
| 10 | 100 |
| 5 | 100 |
| 1 | 100 |

EXAMPLE 7

The importance of the thickening agent in accelerating the sedimentation process is illustrated in the following table which shows the effect of varying the type and amount of thickening agent in the developer of Example 1.

| Thickening Agent | g/l | % solid removed after | | | | | |
|---|---|---|---|---|---|---|---|
| | | 1 day | 2 days | 3 days | 6 days | 8 days | 10 days |
| CMC | 12 | 100 | | | | | |
| | 6 | 84 | 100 | | | | |
| | 3 | 66 | 95 | 100 | | | |
| Hydroxyethyl cellulose | 10 | 100 | | | | | |
| Polyacrylamide (M. wt. 5,000,000) | 2.5 | 100 | | | | | |
| Cyanamer P26 | 10 | 60 | 96 | 100 | | | |
| Versicol E9 | 10 | 100 | | | | | |
| Polyethylene imine | 5 | 32 | 65 | 78 | 91 | 100 | |
| None | | 23 | 34 | 58 | 78 | 92 | 100 |

Cyanomer P26 = polyacrylamide/polyacrylate copolymer from Cyanamid Corp.
Versicol E9 = polyacrylic acid from Allied Colloids.

EXAMPLE 8

The salt concentration of the developer, in particular the sulphite concentration plays an important part in determining the rate of sedimentation. In the following table the sulphite concentration of the used developer of Example 1 was varied whilst leaving the other components constant.

| Sodium Sulphite g/l | % solids removed after | | |
|---|---|---|---|
| | 1 day | 4 days | 7 days |
| 110 | 100 | | |
| 73 | 68 | 100 | |
| 55 | 57 | 100 | |
| 36 | 46 | 92 | 100 |

Varying the components other than sodium carboxymethyl cellulose or sulphite had little effect on the sedimentation rate.

EXAMPLE 9

A silver chlorobromide gelatin emulsion as used in Example 1 was coated onto a commercially available positive-working printing plate (AMAZON from Howson-Algraphy) at a total coat weight of 4.0 gm m$^{-2}$. The assembly was image-wise exposed and developed for 30 seconds at 30° C. in the following developer (D2).

50 gm/l: sodium sulphite
90 gm/l: sodium carbonate
3 gm/l: 1-phenyl-3-pyrazolidone
12 gm/l: hydroquinone
2 gm/l: potassium bromide.

The plate was then rinsed in an acid stop-bath followed by a uniform U.V. exposure sufficient to expose the underlying positive working diazo layer. After this the plate was transferred to a wash section comprising scrub rollers and water jets as in Example 1 to remove the top-coat of silver, silver halide and gelatin. The plate was subsequently developed in a 10% solution of sodium metasilicate to remove the exposed areas of the diazo leaving a final negative image on the plate.

(Alternatively, after first development the plate could be fixed in a thiosulphate solution (e.g. 20% sodium thiosulphate+2% sodium sulphite) to dissolve undeveloped silver).

After processing several plates the wash water contained about 10 mg/l of solids as silver, silver halide and gelatin.

Equal volumes of this wash water and used developer from this Example were mixed and the sedimentation rate measured as in Examples 5 to 8.

Developer D2 was used as a control and a second developer containing 10 gm/l sodium carboxymethyl cellulose was also used in a repeat experiment. The sedimentation rates were as follows:

| Developer | % solids removed after | | | | |
|---|---|---|---|---|---|
| | 1 day | 5 days | 6 days | 8 daYs | 10 days |
| D2 | 33 | 75 | 83 | 93 | 100 |
| D2 + 10 g/l CMC | 68 | 100 | | | |

EXAMPLE 10

A sulphur sensitised silver iodobromide gelatin emulsion of mean grain size 0.13 μm was coated onto a grained and anodised aluminium substrate to give, after drying, a coat weight of 1.0 gm m$^{-2}$.

AgBr$_{0.98}$I$_{0.02}$: 18 gm/l
gelatin: 12 gm/l

After image-wise exposure through a transparent negative the plate was developed at 25° C. for 60 seconds in the following developer (D3).

Pyrogallol: 3.0 gm/l
Metol: 1.0 gm/l
Sodium Carbonate: 112.5 gm/l
Potassium bromide: 1.5 gm/l
Citric acid: 1.0 gm/l.

The non-exposed areas were washed off using warm water. After drying a relief image remained in the exposed areas which could be used for offset printing purposes.

As in Examples 1 and 9, the solids in the wash waters were accumulated to give a solids content of 3 gm/l as silver, silver halide and gelatin.

On mixing equal proportions of used developer D3 resulting from the development step and the wash water the following sedimentation rates were observed. The sedimentation rates obtained when 10 g/l of sodium carboxymethyl cellulose was present in the developer are also shown.

| Developer | % solids removed after | |
|---|---|---|
| | 1 day | 3 days |
| D3 | 73 | 100 |
| D3 + 10 gm/l CMC | 100 | |

EXAMPLE 11

A printing plate precursor was prepared, image-wise exposed, processed and washed as in Example 1. Following the wash stage the plate was rinsed with water to remove residual non-useful silver carried over from the wash section. The was water contained 10 gm/l of silver and gelatin as in Example 1 and approximately 0.5 gm/l of silver and gelatin was contained in the rinse water. The developer, wash water and rinse water were combined in the proportions indicated below and the percentage of solids removed was measured after the indicated time

| Developer | Wash Water | Rinse Water | % Solids removed after | | |
|---|---|---|---|---|---|
| | | | 1 day | 2 days | 6 days |
| 1 | 1 | 0 | 100 | — | — |
| 3 | 3 | 1 | 100 | — | — |
| 2 | 2 | 1 | 89 | 100 | — |
| 1 | 1 | 1 | 44 | 69 | 100 |

EXAMPLE 12

A printing plate precursor was prepared image-wise exposed, processed and washed as in Example 1. Following the wash stage, the plate was treated with the following finisher solution in order to render the silver image oleophilic.

880 ml: water
5 gm: CMC A397
0.3 gm: Trypsin (Novo Porcine 2500K)
3.0 ml Parmetol A23 (Sterling Chemicals)
10 gm: sodium dihydrogen phosphate
10 gm: disodium hydrogen phosphate
2 gm: phenyl mercaptotetrazole The wash water contained approximately 10 gm/l of silver and gelatin as in Example 1 and the above finisher solution contained approximately 0.5 gm/l of silver and gelatin. The developer, wash water and finisher solution were combined in the proportions indicated below and the percentage solids removed was measured after the indicated time.

| Developer | Wash Water | Finisher solution | % Solids removed after | | |
|---|---|---|---|---|---|
| | | | 1 day | 2 days | 6 days |
| 1 | 1 | 0 | 100 | — | — |
| 3 | 3 | 1 | 100 | — | — |
| 2 | 2 | 1 | 92 | 100 | — |
| 1 | 1 | 1 | 56 | 78 | 100 |

EXAMPLE 13

Using the spent developer and the wash water of Example 1, the ratio by volume of spent developer to wash water was varied. To some of the spent developer/wash water mixtures a commercial bacterial proteinase enzyme (Proteinase D from ABM Chemicals) was added in the amounts indicated below. The percentage solids removed was measured at the times indicated.

| Developer | Wash Water | Ml/l Proteinase | % Solids removed after | | | |
|---|---|---|---|---|---|---|
| | | | 1 day | 2 days | 4 days | 6 days |
| 1 | 1 | 0 | 100 | — | — | — |
| 1 | 1 | 2 | 100 | — | — | — |
| 1 | 2 | 0 | 42 | 77 | 88 | 100 |
| 1 | 2 | 2 | 100 | — | — | — |
| 1 | 2 | 10 | 100 | — | — | — |
| 1 | 3 | 0 | 18 | 48 | 62 | 80 |
| 1 | 3 | 2 | 68 | 92 | 100 | — |
| 1 | 3 | 10 | 100 | — | — | — |

We claim:
1. A method of recovering non-useful silver from an article obtained by image-wise exposing and developing a substrate coated with a layer containing silver-halide and binder, which method comprises physically removing the non-useful silver and binder from the substrate so as to form a suspension of silver in an aqueous solution of the binder, providing a developer which has been used to develop an image-wise exposed substrate coated with a layer containing silver halide, flocculating said suspension by admixture with said developer, separating the flocculated silver and binder and recovering the silver.

2. A method as claimed in claim 1 wherein the substrate is a printing plate precursor.

3. A method as claimed in claim 1 wherein the non-useful silver and binder are physically removed by a scrubbing action, in an aqueous solution.

4. A method as claimed in claim 1 wherein the non-useful silver and binder are physically removed by water jets in an aqueous solution.

5. A method as claimed in claim 1 wherein a plurality of precursors is processed and the physically removed silver from said precursors is allowed to accumulate as a suspension of silver in an aqueous solution of binder.

6. A method as claimed in claim 1 wherein after the physical removal of the non-useful silver and prior to admixture of said suspension of silver with said used developer the method further comprises:
    (i) providing further processing solutions
    (ii) treating said substrate with said processing solutions
    (iii) combining the used processing solutions
    (iv) combining said combined used processing solutions with said suspension of silver.

* * * * *